United States Patent Office 2,954,999
Patented Oct. 4, 1960

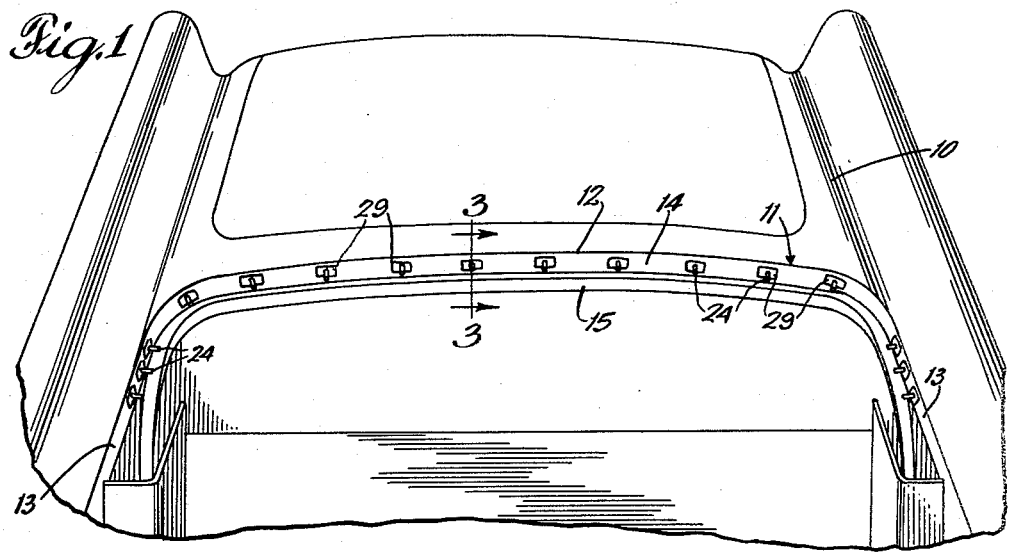
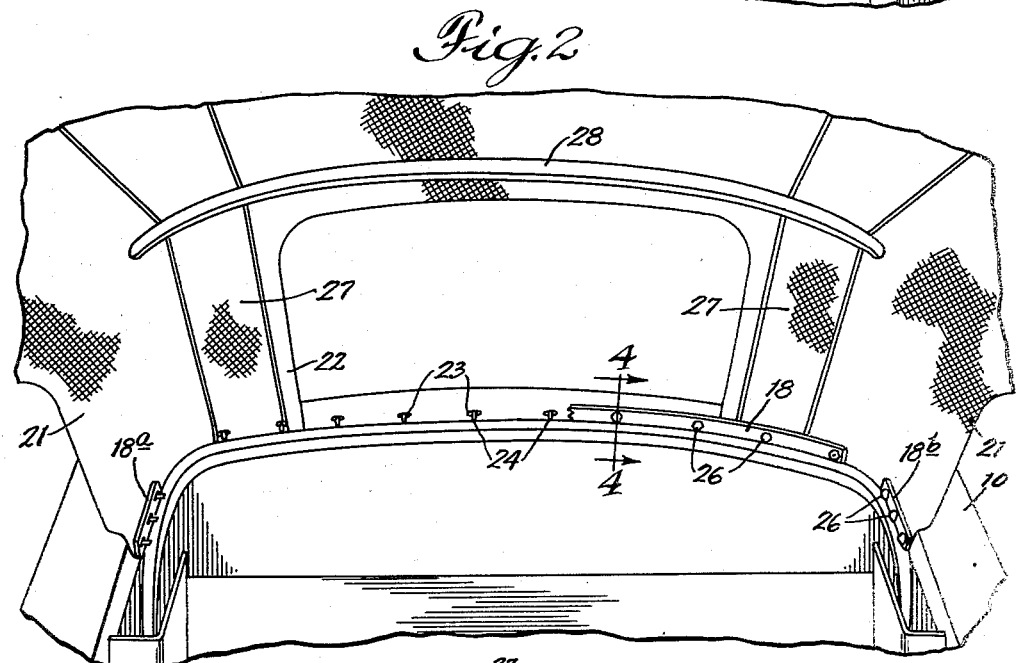
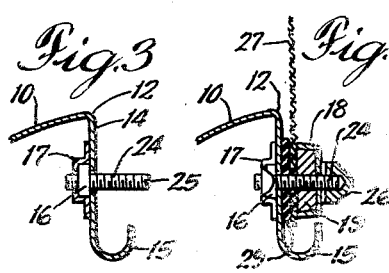
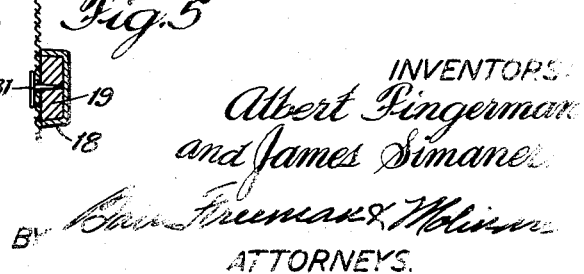

2,954,999

FOLDING TOP CONSTRUCTION

Albert Fingerman, Chicago, and James Simaner, Berwyn, Ill., assignors to Atlas International Company, Chicago, Ill., a partnership Filed Apr. 2, 1957, Ser. No. 650,149

4 Claims. (Cl. 296—107)

This invention relates to a folding top construction for motor vehicles and, more particularly, to the construction of flexible top material and fastening means to secure the same to a vehicle body.

Heretofore it has been the usual practice to form folding vehicle tops, and particularly replacement tops, to leave the lower rear edge of the top material which extends into and is secured to the vehicle body as a raw edge. In installing the top on the vehicle, a great deal of fitting on a cut-and-try basis is required to determine accurately at which points the material should be tacked, or otherwise secured to the usual trim rail to insure good fit.

Furthermore, it has been customary to secure the trim rail and top material to the vehicle body by screws extending through openings in the rail and through the material to thread into sockets on the inner wide wall of the body. In this operation it is difficult and awkward to hold the trim rail and fabric in place while the screws are being inserted and this factor increases the difficulty of mounting the top and obtaining proper fit.

It is one of the objects of the present invention to provide a folding top construction in which the top material can be easily and accurately mounted on the vehicle body with a minimum of fitting.

Another object is to provide a folding top construction in which the top material is formed at its lower edge where it fits into and is secured to the vehicle body with a series of spaced openings accurately positioned to receive fastenings for securing the material to the body, thereby simplifying the installation and insuring accurate fit.

According to a feature of the invention, both the side quarters and the rear curtain are formed with openings in their lower edges to register with openings in the trim rail sections and the sockets in the vehicle body, to locate the trim rail sections accurately relative to the top material and to facilitate securing the trim rail sections and material to the vehicle body.

A further object is to provide a top construction in which the material and trim rail are secured to the body by threaded studs, threaded into sockets in the body and extending through openings in the material and trim rail, with the trim rail and material being secured to the studs by nuts fitting over the ends thereof. This construction enables the material and trim rail, after being tacked or otherwise secured together, to be slipped over the studs and properly held in place thereby while the nuts are being threaded onto the studs, thereby greatly simplifying the installation.

Preferably, the nuts employed are cap nuts to thread a predetermined distance onto the studs and thereafter to thread the studs further into the sockets.

The above and other objects and features of the invention will be more readily apparent from the following description when read in connection with the accompanying drawing, in which:

Figure 1 is a perspective view of the rear portion of a vehicle body to be equipped with a top embodying the invention;

Figure 2 is a view similar to Figure 1, showing the top in place;

Figure 3 is a partial section on line 3—3 of Figure 1;

Figure 4 is a similar section on line 4—4 of Figure 2; and

Figure 5 is a section through the trim rail showing the method of attaching the body material thereto.

The top construction of the present invention is adapted to be employed with a conventional convertible automobile which, as partially illustrated in Figures 1 and 2, has a back deck portion 10 terminating at a belt line 11, which defines the inner passenger compartment. The belt line includes a back part 12 extending across the back of the vehicle at the forward portion of the back deck, which curves into side portions 13 at opposite sides of the vehicle body. The material of the vehicle body is turned down from the belt line to define a downwardly extending flange 14, which may be curved upwardly at its lower edge, as indicated at 15, to form a rain gutter. The rain gutter at the sides of the vehicle body may be cut away from the flange 14 and curved downwardly to discharge openings in the lower part of the body.

The flange 14 is formed at spaced intervals throughout the back portion 12 and the side portions 13 of the belt line, with spaced sockets to receive fastenings for securing the top material in place. As best seen in Figure 3, the sockets are formed by piercing the flange 14 and securing nuts 16 to the back side thereof by straps or cages 17 enclosing the nuts and welded, or otherwise permanently secured, to the back side of the flange.

In the conventional construction, the top material is tacked, or otherwise secured, to a trim rail, one conventional type of which is illustrated in Figures 4 and 5. As shown, the trim rail is formed by a metal channel 18 filled with a material 19 into which tacks or similar fastenings can be driven. The material 19 may be asphaltic material or may be formed by particles, such as sawdust, fibers, or the like, secured together with a suitable binder. The flexible top material or fabric is fastened to the trim rail, preferably by tacking, and the trim rail and fabric are formed with openings through which screws can be inserted to thread into the sockets.

According to the present invention, a top fabric including rear quarters 21 and a rear curtain 22 are adapted to be attached to the vehicle body through special fastenings which facilitate assembly, and the fabric itself is formed to be secured easily to the trim rail with accurate fit. As shown in Figure 2, the lower edges of the fabric, including both the rear quarters and the trim rail, are formed with spaced horizontally elongated openings 23, corresponding with the spacing of the sockets and the openings in the trim rail. It will be understood that the trim rail is punched with horizontally elongated openings spaced to register with the sockets in the body for insertion of the fastenings. The openings 23 in the side quarters and rear curtain of the fabric are similarly spaced and are positioned so that when the fabric is attached to the trim rail with the openings in the fabric registering with the openings in the trim rail, the fabric will accurately and properly fit the vehicle body.

To secure the trim rail and fabric to the body fastenings are provided in the form of studs 24, threaded throughout their length and preferably formed in one end with screwdriver slots 25. The fastenings are completed by nuts 26 which are preferably cap nuts, as shown in Figure 4.

To mount a top according to the present invention the old top fabric is removed in the event of a replacement top so that the vehicle is without any fabric whatever thereon but the usual pads 27 are in place and are secured to the trim rail and to the usual rear bow, as shown partially at 28.

The first step in the installation of the top is to insert the studs 24 in the sockets in the vehicle body and to thread them partially into the nuts 16. In the conventional body construction rubber pads, as shown at 29, are secured to the flange 14 over the openings and these are provided with central openings therethrough, through which the studs may pass. These pads serve as breathers to hold the top material away from the flange 14, so that water can drain into the gutter 15 and be conducted from the body without being trapped to rot the fabric.

The top material is then secured to the trim rail or to the trim rail sections, with the slots 23 in the fabric registering with the openings through the trim rail. The fabric is stretched relatively tight on the trim rail during this operation and may be secured by tacks 31 tacked through the fabric into the material 19 of the trim rail between the slots. After the top material, including both the side quarters and rear curtain have been secured to the trim rail, or to the separate trim rail sections which are employed in most vehicles, and as shown at 18, 18a and 18b, the trim rail or trim rail sections with the material secured thereto, is slipped over the studs 24 which are in place on the vehicle body. The trim rail sections will be held in place by the studs and will be accurately located, so that the top material is correctly fitted to the vehicle body. Thereafter the cap nuts 26 may be threaded onto the projecting ends of the studs and drawn tight. It will be noted that the cap nuts will thread onto the studs only a relatively short distance, after which further tightening will thread the studs further into the sockets so that when the assembly is completed, only the cap nuts will project beyond the surface of the trim rail.

With the present invention the fabric can be very easily and accurately fitted to the trim rail and the assembled fabric and trim rail can be very easily attached to the vehicle body to complete the assembly of the top at the rear belt line portion of the vehicle body. It will be understood that the remainder of the top assembly, including the fastening of the top material to the front bows, may be performed in the usual manner.

While one embodiment of the invention has been shown and described in detail, it will be understood that this is illustrative only and is not to be taken as a definition of the scope of the invention—reference being had for this purpose to the appended claims.

What is claimed is:

1. A folding top construction for a motor vehicle having an inner side wall terminating in a belt line and a series of threaded sockets carried by the side wall below the belt line, said top comprising flexible top material having the rear portion of its lower edge extending into the vehicle adjacent to said inner side wall and having a series of preformed openings therein positioned to register with the sockets when the top material is installed on the vehicle, a trim rail extending along and secured to said lower edge of the material and formed with openings therethrough registering with the openings in the material and the sockets, and screw fastening extending through the openings in the trim rail and material and securing them to the inner side wall of the vehicle.

2. A folding top construction for a motor vehicle having an inner side wall terminating in a belt line and a series of threaded sockets carried by the side wall below the belt line, said top comprising flexible top material having the rear portion of its lower edge extending into the vehicle adjacent to said inner side wall and having a series of preformed openings therein registering with the sockets, a trim rail extending along and secured to said lower edge of the material and formed with openings therethrough registering with the openings in the material and the sockets, a plurality of threaded studs carried by the side wall of the vehicle below the belt line and extending inwardly of the vehicle through the openings in the trim rail and material, and nuts threaded on the studs and engaging the trim rail to secure the trim rail and material to the inner side wall of the vehicle.

3. A folding top construction for a motor vehicle having adjacent its rear part an inner side wall extending across the back and part way along the sides toward the front and a series of spaced threaded sockets in the side wall, said top comprising flexible top material including side quarters and a rear curtain extending into the vehicle adjacent to the side wall and having a series of preformed openings therein registering with the sockets, a trim rail extending along and secured to the material and having openings therein registering with the openings in the material and with the sockets, threaded studs threaded into the sockets and extending inwardly of the vehicle through the openings in the trim rail and material, and nuts threaded onto the studs and engaging the trim rail to secure the trim rail and material to the vehicle.

4. In a folding top construction for a motor vehicle, a flexible top material including side quarters and a rear curtain adapted at their rear lower edges to fit into and be secured to a vehicle body, the rear lower edges of the side quarters and rear curtain having a series of spaced horizontally elongated preformed openings therethrough to receive fastenings for securing the material to a vehicle body.

References Cited in the file of this patent

UNITED STATES PATENTS

| | | |
|---|---|---|
| 2,569,724 | Mackie et al. | Oct. 2, 1951 |
| 2,752,192 | Doty et al. | June 26, 1956 |